H. RYALS.
RAT TRAP.
APPLICATION FILED APR. 13, 1921.
1,431,844.
Patented Oct. 10, 1922.
2 SHEETS—SHEET 1.
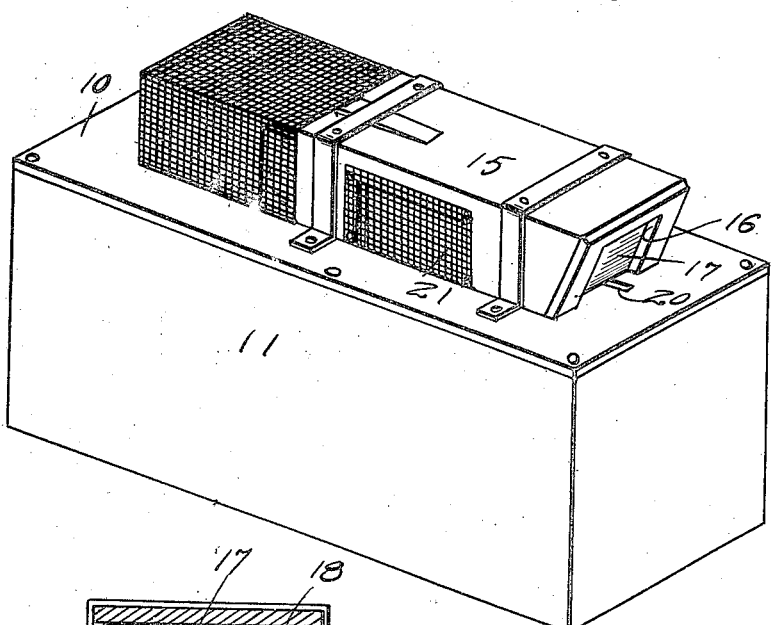
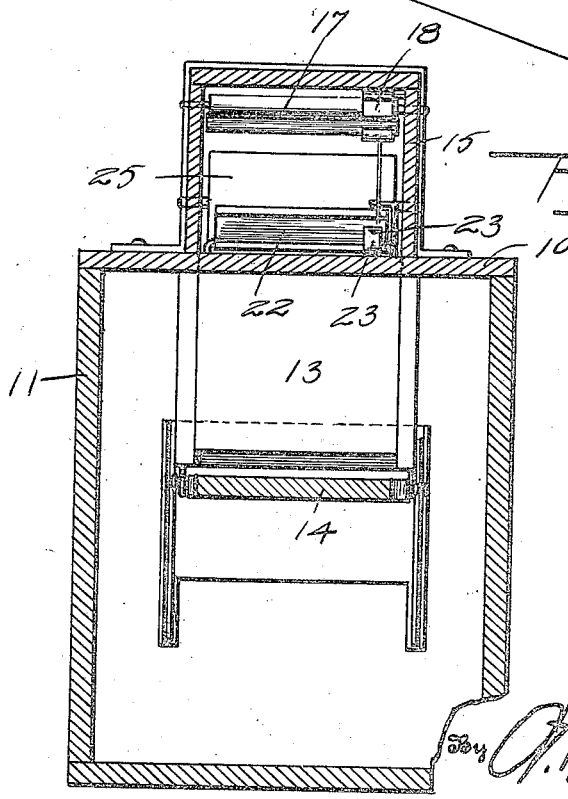
Inventor
H. Ryals

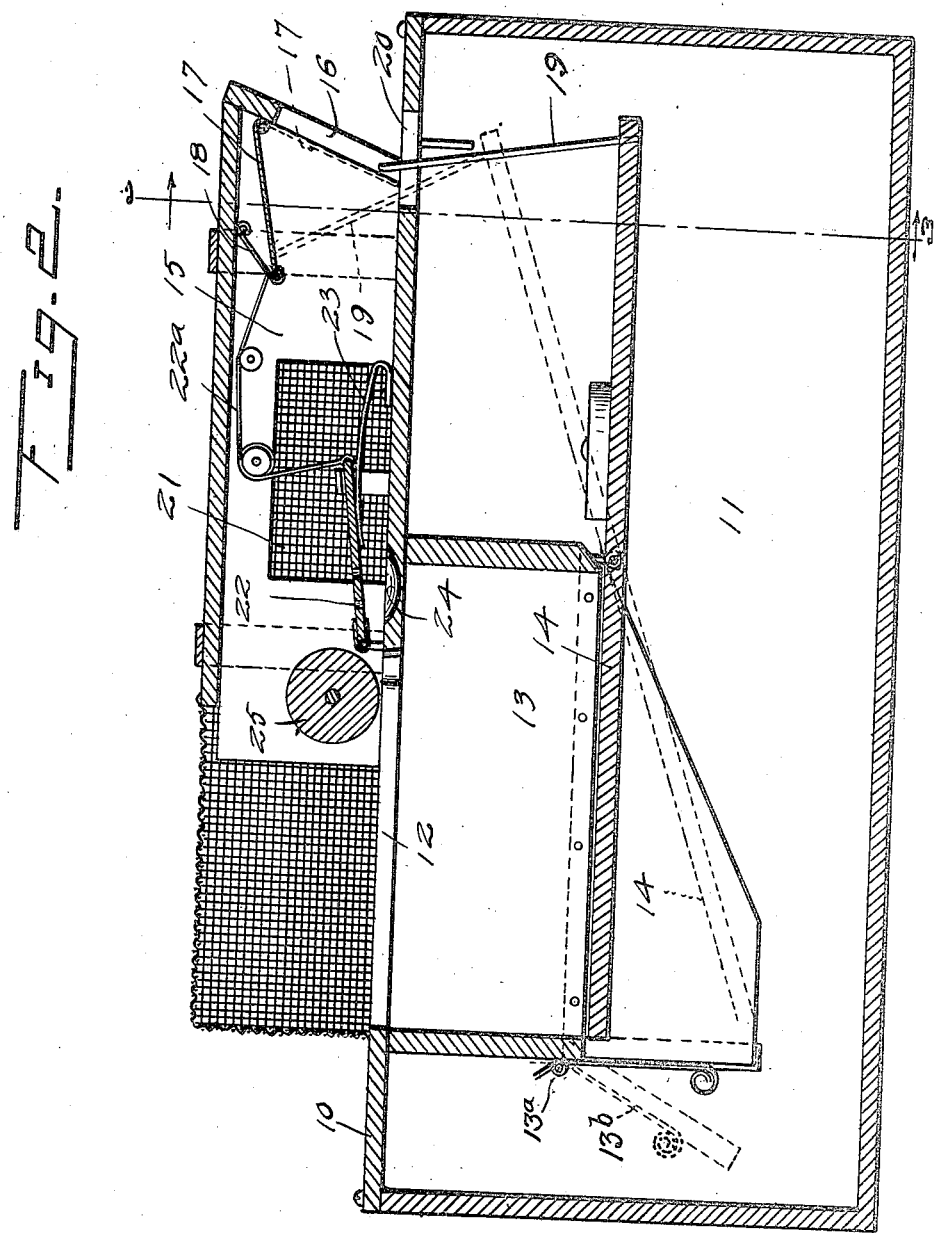

Patented Oct. 10, 1922.

1,431,844

UNITED STATES PATENT OFFICE.

HAMILTON RYALS, OF HELENA, GEORGIA.

RAT TRAP.

Application filed April 13, 1921. Serial No. 461,031.

*To all whom it may concern:*

Be it known that I, HAMILTON RYALS, a citizen of the United States, residing at Helena, R. F. D. #1, in the county of Wheeler and State of Georgia, have invented certain new and useful Improvements in a Rat Trap; and I do hereby declare the following to be a full, clear, and exact description of the invention, such as will enable others skilled in the art to which it appertains to make and use the same.

The object of the invention is to provide a simple and efficient trap for rats and like wary rodents which ordinarily are difficult of capture and which usually will not enter a trap in which a rat has previously been caught; and it is a further object of the invention to provide a trap of the reset type by means of which a plurality of animals may be successively captured without intermediate resetting by the operator and whereby the animals are disposed of as rapidly as caught under conditions leaving no trace of the previous victim, and without the necessity of rebaiting by reason of the fact that the springing of the trap involving the capture of the animal which has entered the same serves to conceal the bait and prevent access thereto; and with these objects in view the invention consists in a construction and combination of parts of which a preferred embodiment is shown in the drawings, wherein:

Figure 1 is a perspective of the trap.

Figure 2 is a longitudinal sectional view of the same showing in full lines the normal and in dotted lines the resetting position of the parts.

Figure 3 is a transverse section on the plane indicated by the line 3—3 of Figure 2.

The platform 10 preferably forms the top of a reservoir or tank 11 which may be filled with water for the purpose of drowning the animals as they are caught, and which is accessible from the plane of the platform through an opening 12 leading to a depending chute 13, at the bottom of which is arranged a pivotal trap door 14 adapted when depressed by the weight of an animal deposited thereon to form a slide serving to project the animal into the water in the tank or reservoir. Pivoted to chute 13 at 13ª is a guard plate or door 13ᵇ normally adapted to hang vertically but movable outwardly by pressure of the captive against it as the door 14 moves to the dotted line position shown in Figure 2, in order to permit the animal to enter tank 11.

The runway 15 surmounting the platform is provided at one end with an entrance opening 16 of which the adjacent wall is preferably inclined inwardly toward its bottom and serves to form a stop to limit the outward swinging movement of a door 17 which is hinged at its upper edge to swing outwardly to closed position. The inclined position of the wall adjacent to the entrance opening serves to insure the holding of the door by gravity in a tightly closed position.

In the path of movement of the free lower edge of the entrance door is a gravity actuated catch 18 with which the door may be engaged by means of a resetting arm 19 carried by the trap door 14 and operating through a slot 20 in the platform, so that after the door has been tripped and closed, it is reopened and secured in its open position by the depression of the trap door 14 through the application thereto of the weight of the animal which has been trapped and which in his effort to escape has been precipitated into the tank or reservoir.

Arranged in the path of progress of an animal entering the runway, of which the walls may be partly constructed of gauze wire as indicated at 21, to admit light to the interior of the runway, is a trip platform 22, yieldingly held in its elevated or normal position by a spring 23, and beneath this trip platform is a bait holder 24 which is exposed to the view of an animal either standing at the side of the runway or at the entrance opening thereof, and between the trip platform and the catch which normally holds the end door in its open position is a connection 22ª so arranged that when the free edge of the trip platform is depressed, the catch is disengaged from the entrance door and the latter thereupon swings to its closed position by gravity. The depression of the trip platform not only releases the entrance door but conceals the bait, and that fact coupled with the sound of the closing entrance door serves to alarm the rat sufficiently to cause him to advance toward the only available outlet which is toward the end of the runway opposite to the entrance opening. That portion of the runway which is beyond the trip platform is preferably composed entirely of screen or gauze wire to further attract the animal by the light admitted to that portion of the passage, and it is this well lighted portion of the runway of which the bottom formed by the platform is cut away to communicate with the chute 13, but interposed between the inner hinged end of the trip platform and the portion of the runway in which the opening 12 is provided, there is located a roller or rolling obstacle 25, over which it is necessary for the rat to pass. This rolling obstacle constitutes a shield or means of concealing the opening in the platform leading to the chute 13, and at the same time when the rat has mounted the roller the tendency thereof is to throw him forward into the chute and thereby into the tank or reservoir. Furthermore as the trap door 14 is normally in a position to conceal the contents of the tank or reservoir the inclination of the rat upon mounting the roller or rolling obstacle is to escape by jumping down upon the surface of the trap door which being in a substantially balanced position will readily yield and slide him into the tank or reservoir.

Having thus described the invention, what I claim is:—

1. A rat trap having a runway provided at one end with an entrance opening and having at the opposite end a floor opening communicating with a chute, a trap door normally closing the chute and depressible by the weight of an animal deposited thereon, an entrance door hinged at its upper edge to open inwardly by a swinging movement, a catch for engaging the free edge of the entrance door to hold it in its open position, and a depressible trip platform arranged between the entrance opening and said bottom opening, within the runway and connected with the catch of the entrance door for releasing the latter, a rolling barrier being arranged between the trip platform and the said bottom opening for concealing the latter from an animal depressing the trip platform.

2. A trap having a captive chamber and a runway, said runway being provided with a trap-opening in the base wall thereof, a chute communicating with said opening and runway depending from said wall, a trap door for said chute, and a barrier extending above said wall and trap door in advance of said opening to conceal the latter.

3. A trap having a captive chamber and a runway, said runway being provided with a trap-opening in the base wall thereof, light decoy means at the rear end of said chamber, a barrier extending above said wall and trap-opening in advance of said opening to conceal the latter, a closure for the entrance of said runway, means in advance of the barrier operable under the weight of a captive to enable closing of said closure to darken the runway, a door for said chute, and means operable to open said closure through closing movement of said door.

In testimony whereof I affix my signature in presence of two witnesses.

HAMILTON RYALS.

Witnesses:
   A. V. WHIDDON,
   EDISON HARBIN.